United States Patent
Cai et al.

(10) Patent No.: US 8,295,245 B2
(45) Date of Patent: *Oct. 23, 2012

(54) INTER-RADIO ACCESS TECHNOLOGY MEASUREMENT SYSTEM AND METHOD

(75) Inventors: Zhijun Cai, Euless, TX (US); Gordon Peter Young, Warwickshire (GB); Takashi Suzuki, Ichikawa (JP); Wei Wu, Coppell, TX (US); James Earl Womack, Bedford, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/271,945

(22) Filed: Oct. 12, 2011

(65) Prior Publication Data

US 2012/0034879 A1 Feb. 9, 2012

Related U.S. Application Data

(63) Continuation of application No. 11/868,879, filed on Oct. 8, 2007, now Pat. No. 8,089,933.

(51) Int. Cl.
*H04W 4/00* (2009.01)

(52) U.S. Cl. .................. 370/331; 370/338; 455/436

(58) Field of Classification Search .................. 370/338, 370/331, 252, 253, 229–238; 455/436–44
See application file for complete search history.

(56) References Cited

U.S. PATENT DOCUMENTS

| | | | |
|---|---|---|---|
| 5,963,866 A | 10/1999 | Palamara et al. | |
| 7,136,644 B2 | 11/2006 | Hull | |
| 7,503,489 B2 | 3/2009 | Heffez et al. | |
| 7,596,385 B2 | 9/2009 | Aghvami et al. | |
| 7,675,846 B2 | 3/2010 | Lindoff et al. | |
| 2002/0059453 A1 | 5/2002 | Eriksson et al. | |
| 2003/0100309 A1 | 5/2003 | Hull | |
| 2003/0118015 A1 | 6/2003 | Gunnarsson et al. | |
| 2003/0228890 A1 | 12/2003 | Falaki | |
| 2004/0039817 A1 | 2/2004 | Lee et al. | |
| 2004/0259546 A1 | 12/2004 | Balachandran et al. | |
| 2005/0277416 A1 | 12/2005 | Tolli et al. | |
| 2006/0148487 A1 | 7/2006 | Kim et al. | |
| 2006/0166699 A1 | 7/2006 | Aghvami et al. | |
| 2006/0223557 A1 | 10/2006 | Manohar | |

(Continued)

FOREIGN PATENT DOCUMENTS

DE 102005022762 A1 11/2006

(Continued)

OTHER PUBLICATIONS

Cai, Zhijun, et al.; U.S. Appl. No. 11/868,879; Titled: "Inter-Radio Access Technology Measurement System and Method", filed Oct. 8, 2007; Specification—24 pgs.; 6 Drawing Sheets (Figures 1-7).

(Continued)

*Primary Examiner* — Gary Mui

(74) *Attorney, Agent, or Firm* — Conley Rose, P.C.; J. Robert Brown, Jr.

(57) ABSTRACT

A network access device is provided with one or more processors configured for macrotechnology-based transmission to a multi-mode user equipment of a signal including a plurality of data portions and a plurality of gaps between one or more of the plurality of data portions, wherein at least one of the gaps is used by the multi-mode user equipment for measurement of a first signal strength of a microtechnology-based network.

12 Claims, 6 Drawing Sheets

U.S. PATENT DOCUMENTS

| | | |
|---|---|---|
| 2007/0149226 A1 | 6/2007 | de Vries |
| 2007/0207824 A1 | 9/2007 | Bhattacharjee et al. |
| 2008/0102880 A1 | 5/2008 | Gholmieh et al. |
| 2008/0267114 A1 | 10/2008 | Mukherjee et al. |

FOREIGN PATENT DOCUMENTS

| | | |
|---|---|---|
| EP | 1827047 A1 | 8/2007 |
| WO | 2004025983 A1 | 3/2004 |
| WO | 2005064970 A1 | 7/2005 |
| WO | 2006100653 A2 | 9/2006 |
| WO | 2007103822 A2 | 9/2007 |

OTHER PUBLICATIONS

Cai, Zhijun, et al.; U.S. Appl. No. 11/868,000; Titled: "Proximity of User Equipment to a Home Local Network"; filed Oct. 5, 2007; Specification—24 pgs.; 5 Drawing Sheets (Figures 1-6).

Cai, Zhijun, et al.; U.S. Appl. No. 11/869,437; Titled: "System and Method for Inter-Radio Access Technology Signal Measurement"; filed Oct. 9, 2007; Specification—29 pgs.; 6 Drawing Sheets (Figures 1-7).

Cai, Zhijun, et al.; U.S. Appl. No. 13/271,985; Titled: "System and Method for Inter-Radio Access Technology Signal Measurement"; filed Oct. 12, 2011.

Huawei; 3GPP TSG-RAN Working Group 4 (Radio) meeting #44; Title: "Condsiderations on Gap Design for Gap-assisted Measurements"; R4-071181; Athens, Greece; Aug. 20-24, 2007; 2 pgs.

Nokia Siemens Networks, Nokia; 3GPP TSG-RAN WG4 Meeting #43bis; Title: "Measurement Gap Creation"; R4-070927; Orlando, Florida; Jun. 25-29, 2007; 4 pgs.

Nokia Siemens Networks, Nokia; 3GPP TSG-RAN WG2 Meeting #59; Title: "Measurement Gap Creation"; R2-073397; Athens, Greece; Aug. 20-24, 2007; 5 pgs.

European Search Report; EP Application No. 08100820.3; Aug. 4, 2008; 7 pgs.

European Search and Examination Report; EP Application No. EP07120826.8; Feb. 12, 2008; 9 pgs.

European Communication; EP Application No. EP07120826.8; Oct. 13, 2009; 1 pg.

European Communication; EP Application No. EP07120826.8; Jan. 10, 2011; 6 pg.

Third European Search Report; EP Application No. EP07120826.8; Aug. 2, 2011; 7 pgs.

Canadian Office Action; Application No. 2,639,809; Oct. 13, 2011; 4 pages.

European Extended Search Report; Application No. 11185841.1; Nov. 22, 2011; 11 pages.

European Search Report; EP Application No. 08100007.7-2412; May 14, 2008; 7 pgs.

Second European Examination Report; EP Application No. 08100007.7; May 28, 2009; 4 pgs.

Summons to Attend Oral Proceedings, EP Application 08100007.7, Mar. 9, 2010, 4 pgs.

Brief Communication, EP Application No. 0810007.7; Jun. 8, 2010; 1 pg.

Canadian Office Action; Application No. 2,639,808; Oct. 27, 2011; 3 pages.

European Search and Examination Report; EP Application No. EP10190383.9; Feb. 17, 2011; 9 pgs.

Office Action dated Jun. 17, 2010, 14 pages, U.S. Appl. No. 11/868,879, filed Oct. 8, 2007.

Notice of Allowance dated Dec. 20, 2010, 6 pages, U.S. Appl. No. 11/868,879, filed Oct. 10, 2007.

Notice of Allowance dated Feb. 18, 2011, 13 pages, U.S. Appl. No. 11/868,879, filed Oct. 10, 2007.

Notice of Allowance dated Jun. 20, 2011, 10 pages, U.S. Appl. No. 11/868,879, filed Oct. 10, 2007.

Office Action dated Aug. 23, 2010, 15 pages, U.S. Appl. No. 11/868,000, filed Oct. 5, 2007.

Final Office Action dated Jan. 7, 2011, 15 pages, U.S. Appl. No. 11/868,000, filed Oct. 5, 2007.

Office Action dated Jun. 2, 2011, 16 pages, U.S. Appl. No. 11/868,000, filed Oct. 5, 2007.

Interview Summary dated Jul. 29, 2011, 3 pages, U.S. Appl. No. 11/868,000, filed Oct. 5, 2007.

Final Office Action dated Oct. 13, 2011, 13 pages, U.S. Appl. No. 11/868,000, filed Oct. 5, 2007.

Office Action dated Jun. 16, 2010, 25 pages, U.S. Appl. No. 11/869,437, filed Oct. 9, 2007.

Final Office Action dated Dec. 16, 2010, 12 pages, U.S. Appl. No. 11/869,437, filed Oct. 9, 2007.

Advisory Action dated Feb. 24, 2011, 8 pages, U.S. Appl. No. 11/869,437, filed Oct. 9, 2007.

Notice of Allowance dated Aug. 11, 2011, 9 pages, U.S. Appl. No. 11/869,437, filed Oct. 9, 2007.

Final Office Action dated May 2, 2012; U.S. Appl. No. 11/868,000, filed Oct. 5, 2007; 13 pages.

European Extended Search Report; Application No. 11189921.7; Feb. 2, 2012; 7 pages.

European Examination Report; Application No. 07120826.6; Feb. 20, 2012; 4 pages.

Office Action dated Jan. 9, 2012; U.S. Appl. No. 11/868,000, filed Oct. 5, 2007; 15 pages.

European Extended Search Report; Application No. 11189922.5; May 22, 2012; 8 pages.

European Extended Search Report; Application No. 11189923.5; May 22, 2012; 8 pages.

Advisory Action dated Jul. 6, 2012; U.S. Appl. No. 11/868,000, filed Oct. 5, 2007; 6 pages.

Office Action dated Jul. 23, 2012; U.S. Appl. No. 13/271,985, filed Oct. 12, 2011; 26 pages.

Cai, Zhijun, et al.; U.S. Application No. 13/6131795 filed Sep. 13, 2012; Title: "Inter-Radio Access Technology Measurement System and Method".

European Intent to Grant; Application No. 07120826.6; Aug. 9, 2012; 8 pages.

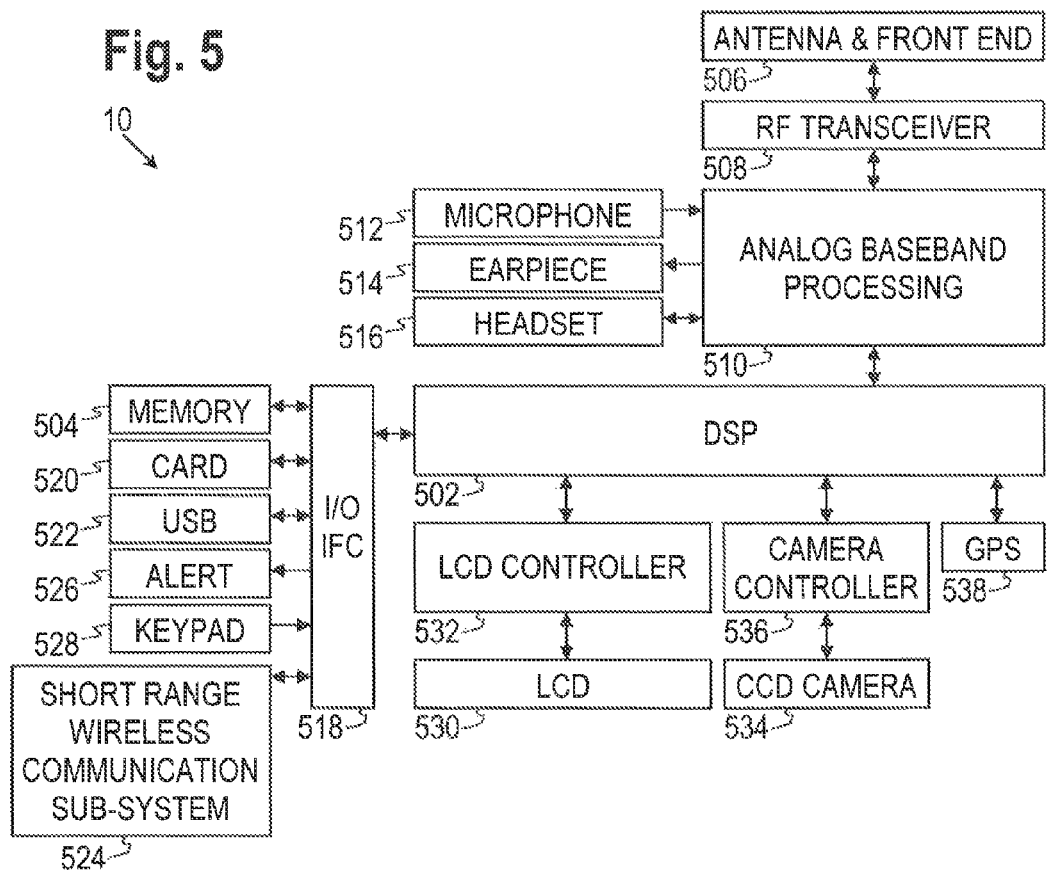
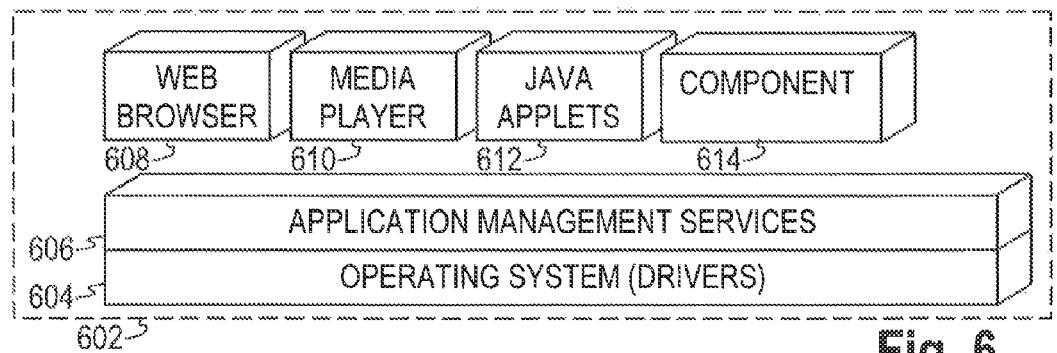

INTER-RADIO ACCESS TECHNOLOGY MEASUREMENT SYSTEM AND METHOD

CROSS-REFERENCE TO RELATED APPLICATIONS

This application is a continuation of U.S. patent application Ser. No. 11/868,879 filed on Oct. 8, 2007, and entitled "Inter-Radio Access Technology Measurement System and Method," which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as user equipment (UE). A communications connection between two UEs can be referred to as a call or a session.

As telecommunications technology has evolved, more advanced equipment has been introduced that can provide services that were not possible previously. This advanced equipment might include, for example, an Enhanced Node B (ENB) rather than a base station or other systems and devices that are more highly evolved than the equivalent equipment in a traditional wireless telecommunications system. Such advanced or next generation equipment may be referred to herein as long-term evolution (LTE) equipment.

In traditional wireless telecommunications systems, transmission equipment in a base station transmits signals throughout a geographic region known as a cell. For LTE and other advanced equipment, the region in which a UE can gain access to a telecommunications network might be referred to by a different name, such as a hot spot. The term "cell" will be used herein to refer to any region in which a UE can gain access to a telecommunications network, regardless of the type of UE and regardless of whether the region is a traditional cell, a region served by LTE equipment such as an ENB, or some other region or location in which wireless telecommunications services are available.

Different UEs might use different types of radio access technology (RAT) to access a telecommunications network. Some UEs, which can be referred to as multi-domain UEs or multi-mode UEs, are capable of communicating using more than one RAT. For example, multi-mode UEs may include UEs that can obtain service from at least one mode of UMTS (Universal Mobile Telecommunications System), and one or more different systems such as GSM (Global System for Mobile Communications) bands or other radio systems. As defined herein, multi-mode UEs may be of any various type of multi-mode UE as defined or provided in 3GPP ($3^{rd}$ Generation Partnership Project), Technical Specification Group (TSG) Terminals, Multi-Mode UE Issues, Categories, Principles, and Procedures (3G TR 21.910), which is incorporated herein by reference for all purposes, Often examples of RATs or of network technologies that might use different types of RATs include Code Division Multiple Access (CDMA2000), UTRAN (UTMS Terrestrial Radio Access Network), GSM, GSM EDGE Radio Access Network (GERAN), Generic Access Network (GAN), Wireless Fidelity (WiFi), Wireless Local Area Network (WLAN), General Packet Radio Service (CPRS), Worldwide Interoperability for Microwave Access (WiMAX), 1× Evolution-Data Optimized (1× EV-DO), High-Speed Downlink Packet Access (HSDPA), Digital Enhanced Cordless Technology (DECT), and High Rate Packet Data (HRPD). Other RATs or other network technologies based on these RATs may be familiar to one of skill in the art.

Some technologies, such as GSM and CDMA, may be publicly licensed and regulated and serve cells that cover large geographic areas. Such technologies will be referred to herein as macrotechnologies and the cells that they serve will be referred to as macrocells. Other technologies, such as WiFi and home enhanced node B, may be privately managed and serve cells that cover small spaces such as homes, businesses, or limited publicly accessible areas. Such technologies will be referred to herein as microtechnologies and the cells that they serve will be referred to as microcells.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a block diagram of a user equipment operable for some of the various embodiments of the disclosure.

FIG. 6 is a diagram of a software environment that may be implemented on a user equipment operable for some of the various embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a multi-mode user equipment is provided. The multi-mode user equipment includes a processor configured to promote measurement of a signal strength of a microtechnology-based network during a portion of a macrotechnology-based communication from a network component to the multi-mode user equipment. The signal strength of the microtechnology-based network is measured during a portion of the macrotechnology-based communication when no user data is being transmitted.

In another embodiment, a method for measuring signal strength is provided. The method includes creating a gap in a data transmission of a macrotechnology-based communication and measuring a signal strength of a microtechnology-based network during the gap in the data transmission of the macrotechnology-based communication.

In another embodiment, a macrotechnology-based system is provided. The system includes a processor configured to promote macrotechnology-based transmission to a multi-mode user equipment of a signal including a plurality of data portions and a plurality of gaps between one or more of the plurality of data portions, at least one of the gaps used by the multi-mode user equipment for measurement of a signal strength of a microtechnology-based network.

As a UE that is engaged in a call in a macrocell approaches a microcell, it may become desirable to hand the call off from the macrocell to the microcell. For example, since a call made via WiFi might be less expensive than a call made via GSM, a UE user might wish to have an existing GSM call handed off to a WiFi network in the user's home upon arriving at the home. Therefore, a UE might need to measure the quality of the signal it receives from a microcell to determine if a call can be handed off to the microcell. In other situations, microcell signal quality measurements might be made for other reasons.

Figure 1:
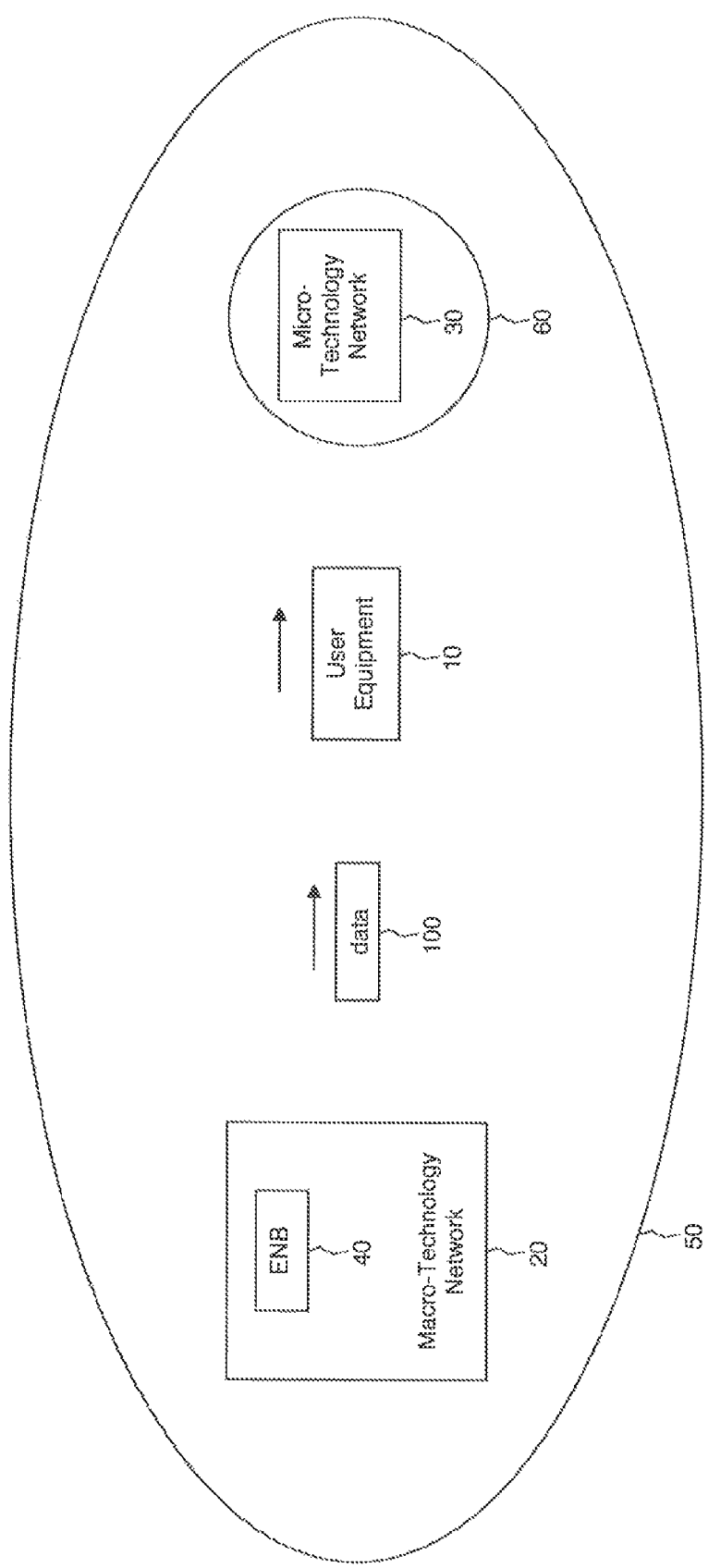
FIG. 1 is a block diagram of a telecommunications system according to an embodiment of the disclosure.

FIG. 1 illustrates a situation in which such a measurement might occur. A UE 10 is moving from a macrotechnology-based network 20 toward a microtechnology-based network 30. The macrotechnology-based network 20 includes an ENB 40, a traditional base station, or a similar component. Hereinafter, any such macrotechnology-based component will be referred to as the ENB 40. The macrotechnology-based network 20 serves a macrocell 50, and the microtechnology-based network 30 serves a microcell 60 within the macrocell 50. The UE 10 may be engaged in a macrotechnology-based call via the ENB 40. That is, the ENB 40 is transmitting macrotechnology-based data 100 to the UE 10 or is otherwise in communication with the UE 10.

The ENB 40 and the microtechnology-based network 30 transmits pilot signals (e.g. beacon in WiFi) that the UE 10 can measure to determine whether the call should continue through the ENB 40 or should be handed off to the microtechnology-based network 30. The pilot signal from the ENB 40 might extend throughout the macrocell 50, while the pilot signal from the microtechnology-based network 30 might cover only the small area of the microcell 60. When the UE 10 is a large distance from the microcell 60, the UE 10 might not be able to detect the pilot signal from the microtechnology-based network 30. As the UE 10 approaches the microcell 60, the strength of the pilot signal from the microtechnology-based network 30 might increase to a level that indicates that a handoff of the call from the ENB 40 to the microtechnology-based network 30 may be possible.

In some cases, the UE 10 might make periodic measurements of the strength of the pilot signal from the microtechnology-based network 30 to determine if that signal is sufficiently strong to allow a handoff from the ENB 40 to the microtechnology-based network 30. These measurements might be made regardless of the location of the UE 10. In other cases, the UE 10 might use techniques that are beyond the scope of this disclosure to determine when it is close to the microtechnology-based network 30 and might make measurements of the strength of the pilot signal from the microtechnology-based network 30 only when it is in the proximity of the microtechnology-based network 30.

Figure 2:
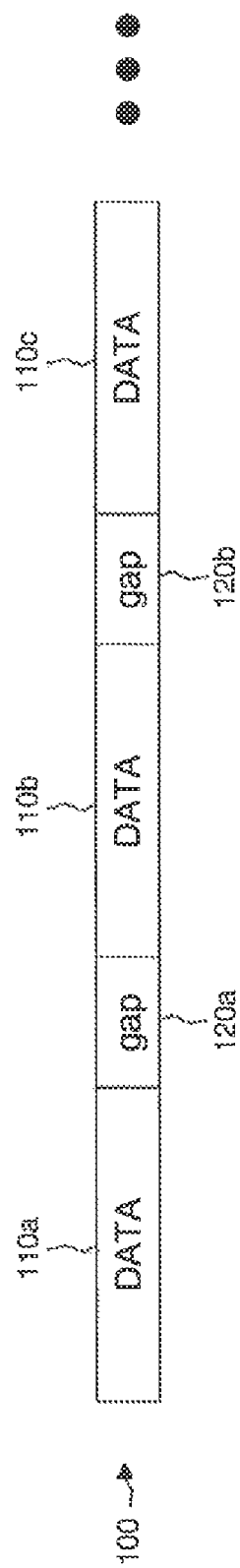
FIG. 2 is a diagram of a data transmission according to an embodiment of the disclosure.

FIG. 2 illustrates a detailed view of the data transmission 100 from the ENB 40 to the UE 10. The transmission 100 consists of a series data strings 110 separated by transmission gaps 120 during which no data is transmitted. The data strings 110 might represent portions of a voice call or of some other type of a user-directed data transmission. During the gaps 120, no user-directed data is transmitted, and the UE 10 can use the gaps 120 to measure the strengths of the pilot signals that it receives from other macrocells using different radio technologies or frequencies. If the UE 10 finds a pilot signal from another macrocell using different radio technologies or frequencies that is sufficiently stronger than the pilot signal from the current serving ENB 40, an inter-RAT (Radio Access Technology) or inter-frequency handoff to the other macrocell using different radio technologies or frequencies might be initiated.

Different macrotechnology RATs might use different patterns of data strings 110 and transmission gaps 120. For example, GSM might have data strings 110 and transmission gaps 120 with a first set of sizes, and CDMA might have data strings 110 and transmission gaps 120 with a second set of sizes. The ENB 40 may specify the gap pattern that is in use in its macrocell 50 and provide this information to the UEs 10 in the macrocell 50. In this way, the UEs 10 can be aware of when the gaps 120 will occur and pilot signal strength measurements for other macrocells can be made.

Such a handoff procedure may not be possible for a macrocell-to-microcell handoff. As mentioned above, a multi-mode UE might be able to communicate using either a microtechnology or a macrotechnology and thus may be capable of having its calls handed off from a macrocell to a microcell. However, some multi-mode UEs may not be able to communicate in both a microtechnology and a macrotechnology simultaneously. When such a UE performs signal strength measurements to determine if a macrocell-to-microcell handoff can take place, it may not be possible for the measurements to occur in the manner described above for a macrocell-to-macrocell handoff.

For example, the UE 10 might not be able to perform a measurement of the strength of a microtechnology-based pilot signal from the microtechnology-based network 30 while the UE 10 is receiving one of the macrotechnology-based data strings 110, since such a measurement might require the simultaneous reception of the microtechnology-based pilot signal and the macrotechnology-based data string 110. Similarly, a microtechnology-based pilot signal strength measurement might not be possible in one of the transmission gaps 120, since a measurement of the strength of a macrotechnology-based pilot signal might be occurring at that time.

In an embodiment, one of a plurality of techniques might be used to perform a microtechnology-based pilot signal strength measurement when a macrotechnology-based call is in progress on a multi-mode UE. These techniques, while described as applying to a macrocell-to-microcell handoff, may also be applicable to a microcell-to-macrocell handoff.

In a first technique, a new common measurement gap pattern is defined. As mentioned above, each different type of RAT has traditionally used a different pattern of data strings 110 and transmission gaps 120. In this embodiment, a gap pattern is defined that can be used by a plurality of RATs. For example, a first gap 120 in the gap pattern might be dedicated for use by a first RAT, a second gap 120 in the gap pattern might be dedicated for use by a second RAT, and so on. The UE 10 could then make a microtechnology-based pilot signal strength measurement in one of the transmission gaps 120 in this gap pattern and could make a macrotechnology-based pilot signal strength measurement in another of these transmission gaps 120.

In an alternative of this technique, a common gap pattern could be defined that allows a plurality of pilot signal strength measurements to occur in each of a plurality of gaps 120. For example, in a first gap 120, a first macrotechnology-based pilot signal strength measurement and a second macrotechnology-based pilot signal strength measurement might take place. In a second gap 120, a first microtechnology-based pilot signal strength measurement and a second microtechnology-based pilot signal strength measurement might take place. Alternatively, in a first gap 120, a first macrotechnology-based pilot signal strength measurement and a first microtechnology-based pilot signal strength measurement might take place, and in a second gap 120, a second macrotechnology-based pilot signal strength measurement and a second microtechnology-based pilot signal strength measurement might take place.

In a second technique, one or more of the transmission gaps 120 are used to perform microtechnology-based pilot signal strength measurements instead of macrotechnology-based pilot signal strength measurements. That is, in at least one of the transmission gaps 120, the UE 10 does not make a macrotechnology-based pilot signal strength measurement as it typically would, but instead makes a microtechnology-based pilot signal strength measurement. For example, when the UE 10 is receiving a GSM-based data transmission 100, the UE 10 might traditionally make a GSM-based pilot signal strength measurement in each of the gaps 120 in the transmission 100. In the second technique, however, instead of a GSM-based pilot signal strength measurement, the UE 10 might make a microtechnology-based pilot signal strength measurement in one or more of the gaps 120.

In a third technique, the UE 10 requests the ENB 40 to create a new transmission gap 120 in which a microtechnology-based pilot signal strength measurement can be made. Traditionally, the ENB 40 assigned the transmission gaps 120 and the UE 10 made use of the gaps 120 as assigned without any input from the UE 10 to the ENB 40. In this embodiment, however, the UE 10 explicitly requests the ENB 40 to assign a gap or a gap pattern specifically for use by the UE 10. In the request, the UE 10 might specify the parameters of the measurement it wishes to make, such as the type of RAT for which the UE 10 wishes to make the measurement. Since the ENB 40 controls the scheduling of the data strings 110 and transmission gaps 120, the ENB 40 can assign the gap 120 as requested and can then inform the UE 10 as to when the gap 120 is scheduled to occur. The UE 10 can then use the newly assigned gap 120 to make a microtechnology-based pilot signal strength measurement.

In a fourth technique, the UE 10 uses idle time within the data strings 110 to make microtechnology-based pilot signal strength measurements. In the data string portion 110 of the data transmission 100, a technique known as discontinuous reception (DRC) is sometimes used. In DRX, data may be transmitted from the ENB 40 to the UE 10 during only a small portion of the data string 110. For example, if one of the data strings 110 lasts a relatively longer period of time, such as 20 milliseconds, data may be transmitted for only a relatively shorter portion of that time, such as a few milliseconds, and the remaining time may be idle time. In an embodiment, the UE 10 can make a microtechnology-based pilot signal strength measurement during one of these idle periods in one of the data strings 110.

In a fifth technique, the size of the transmission gaps 120 is increased to allow both a microtechnology-based pilot signal strength measurement and a macrotechnology-based pilot signal strength measurement in a single transmission gap 120. For example, one of the transmission gaps 120 might traditionally have lasted 5 milliseconds, and a macrotechnology-based pilot signal strength measurement might have occupied the majority of this 5 millisecond period. In an embodiment, such a transmission gap 120 might be increased to 10 milliseconds, for example. Of this 10 millisecond period, approximately 5 milliseconds might still be occupied by the macrotechnology-based pilot signal strength measurement, and a microtechnology-based pilot signal strength measurement might be made in the remaining 5 milliseconds.

These five techniques can be categorized in different ways. In one embodiment, the first, second, fourth, and fifth techniques are placed in the same category because these techniques involve the ENB 40 assigning gaps 120 for use by the UE 10 without any input from the UE 10. The third technique is placed in a different category because this technique involves the UE 10 making a request to the ENB 40 for gaps 120 in which measurements can be made.

In another embodiment, the first, second, third, and fifth techniques are placed in the same category because these techniques involve the UE 10 making measurements during the transmission gaps 120. The fourth technique is placed in a different category because this technique involves the UE 10 making measurements within the data strings 110.

Figure 3:
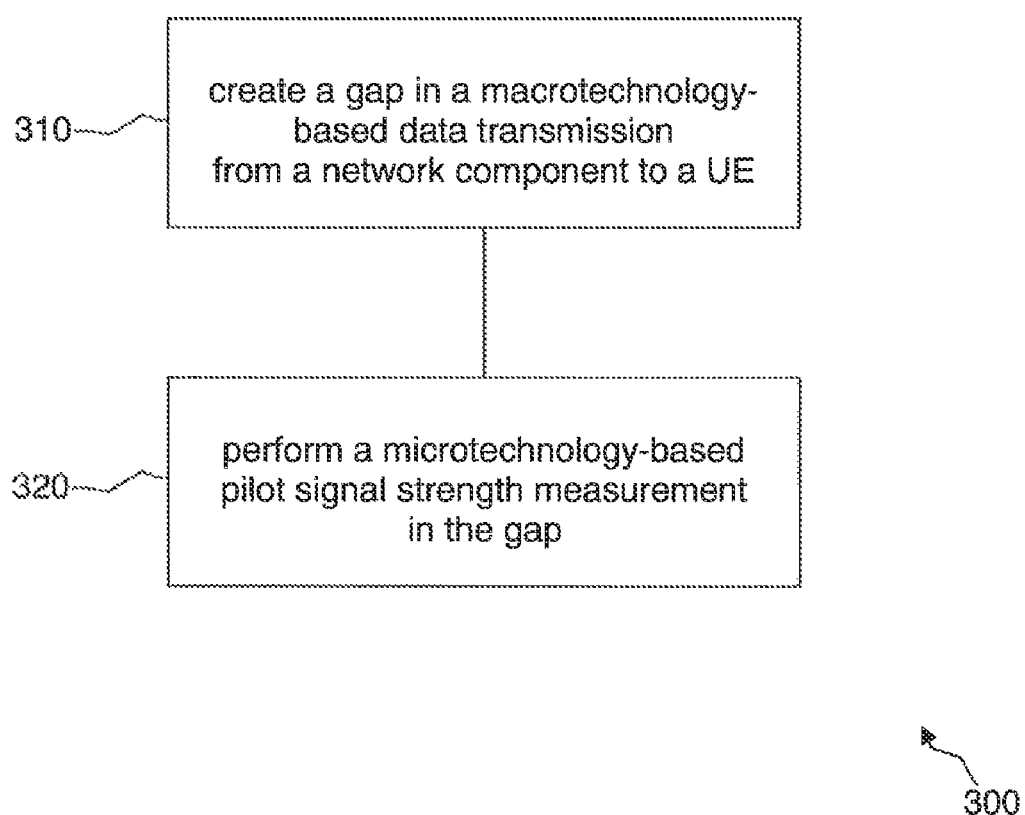
FIG. 3 is a diagram of a method for measuring signal strength according to an embodiment of the disclosure.

FIG. 3 illustrates an embodiment of a method 300 for measuring the strength of a pilot signal from a microtechnology-based network. At block 310, a gap in a macrotechnology-based data transmission from a network component to a UE is created. The gap might be created by the network component assigning the gap without input from the UE, or the gap might be created based on a request from the UE to the network component. At block 320, the UE performs a microtechnology-based pilot signal strength measurement in the gap.

Figure 4:
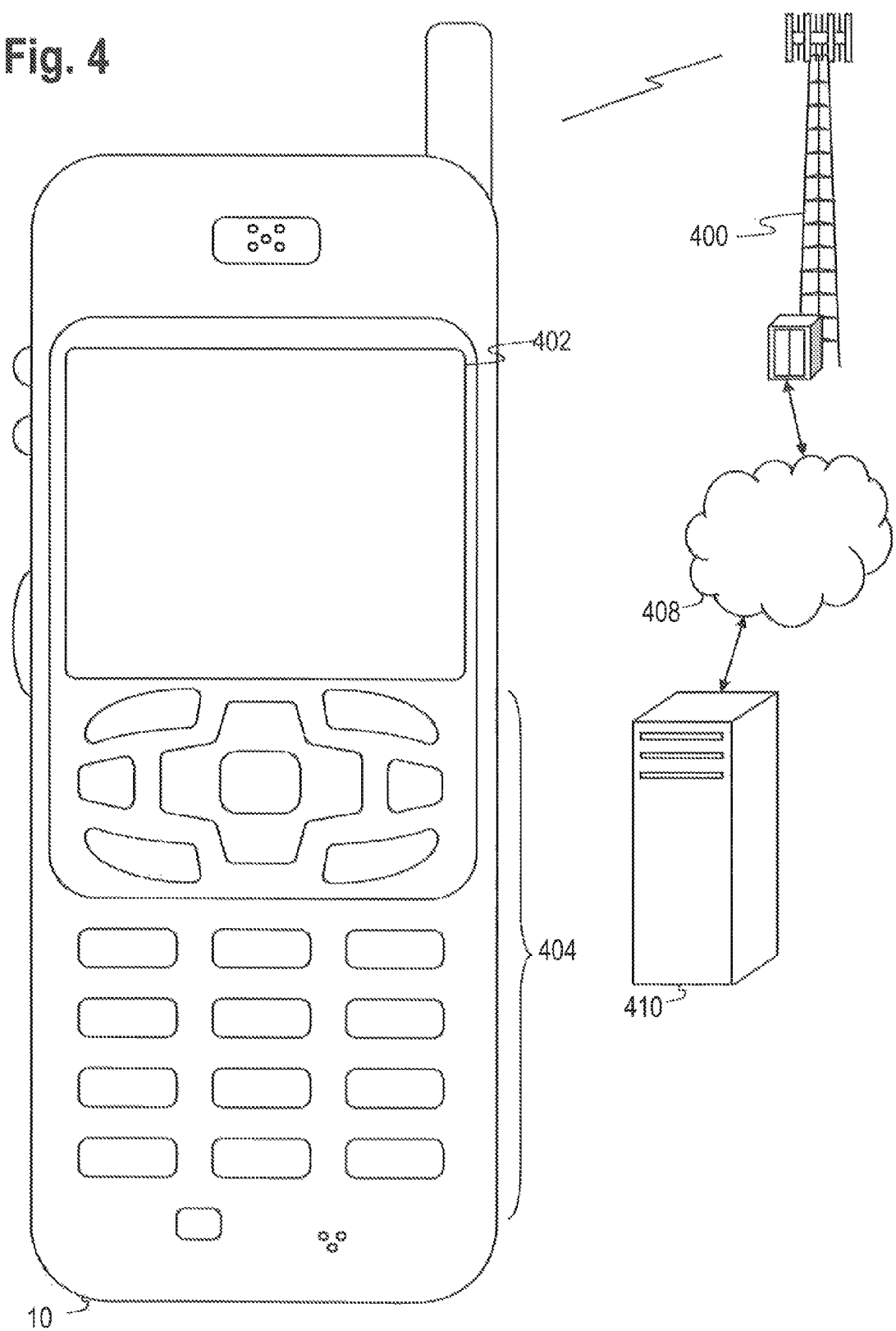
FIG. 4 is a diagram of a wireless communications system including a user equipment operable for some of the various embodiments of the disclosure.

As mentioned above, microtechnologies and the cells that they serve may be referred to as microcells. However microtechnologies may not be the only technologies capable of providing macro and micro cells, and some technologies may be considered capable of being operated in macro and macro cell configurations. FIG. 4 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device, The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as OWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions In response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

FIG. 5 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 and a memory 504. As shown, the UE 10 may further include an antenna and front end unit 506, a radio frequency (RF) transceiver 508, an analog baseband processing unit 510, a microphone 512, an earpiece speaker 514, a headset, port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen, In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-ire microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

FIG. 6 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 6 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the measurement of pilot signals.

Figure 7:
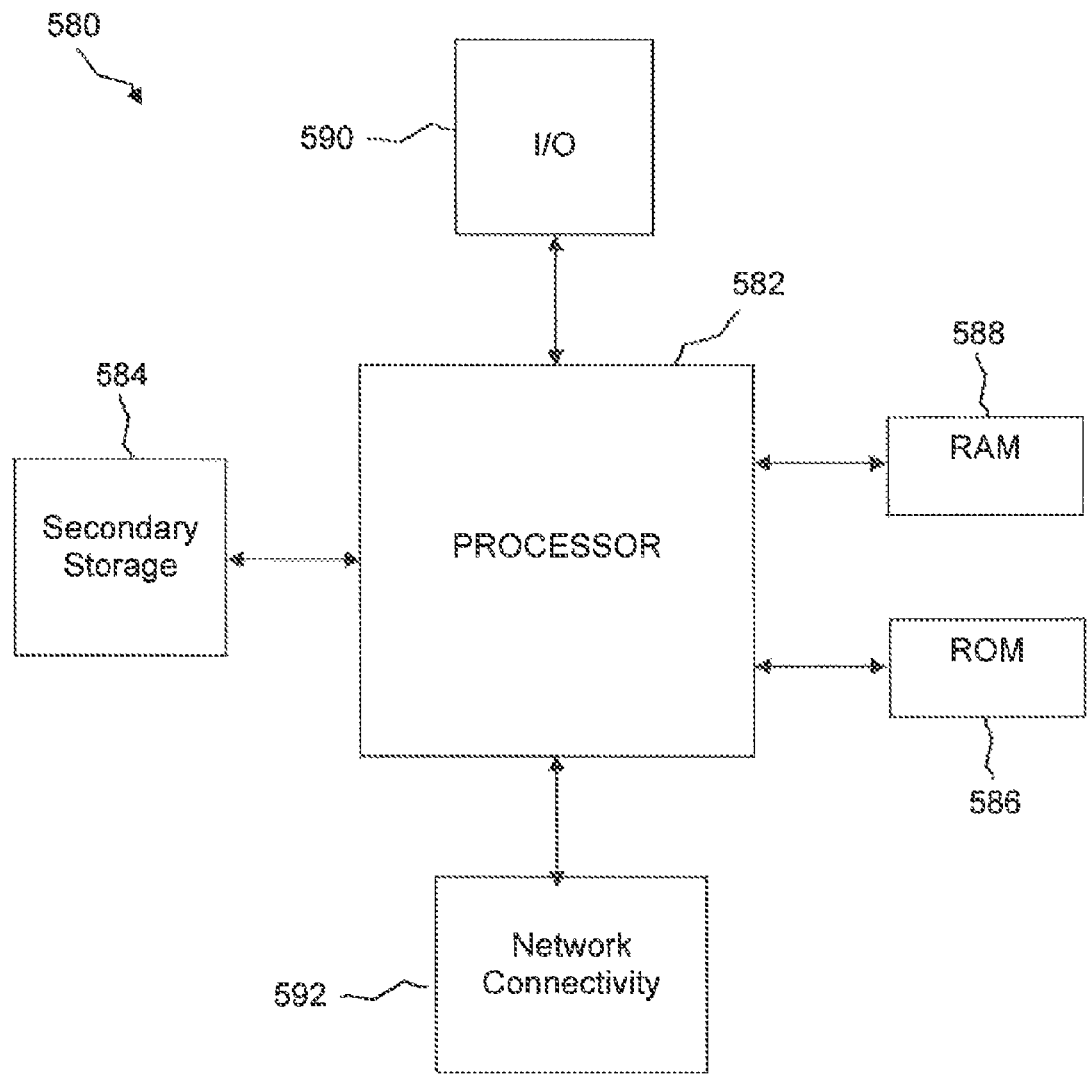
FIG. 7 illustrates an exemplary general-purpose computer system suitable for implementing the several embodiments of the present disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave. The network connectivity devices 592 may also include one or more transmitter and receivers for wirelessly or otherwise transmitting and receiving signal as are well know to one of ordinary skill in the art.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some Interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network access device, comprising:
   one or more processors configured for macrotechnology-based transmission to a multi-mode user equipment of a signal including a plurality of data portions and a plurality of gaps between one or more of the plurality of data portions, wherein at least one of the gaps is used by the multi-mode user equipment for measurement of a first signal strength of a microtechnology-based network, wherein the processor is further configured to use a gap previously designated for macrotechnology-based signal strength measurement to perform the microtechnology-based signal strength measurement.

2. The network access device of claim 1, wherein the at least one of the plurality of gaps is generated based upon a request received from the multi-mode user equipment.

3. The network access device of claim 1, wherein the processor is configured to:
   define a new common measurement gap pattern usable by both a microtechnology and a macrotechnology.

4. The network access device of claim 1, wherein the microtechnology is one of:
   a Wireless Fidelity network,
   a wireless local access network using a home base station,
   a wireless local access network using a home Enhanced Node B, and
   a Wireless Local Area Network; and
   wherein the macrotechnology is one of:
   a Long Term Evolution (LTE) network,
   a Ultra Mobile Broadband (UMB) network;
   a Code Division Multiple Access 2000 network;
   a Universal Mobile Telecommunications System Terrestrial Radio Access Network; a Global System for Mobile Communications (GSM) network;
   a GSM EDGE Radio Access Network; and
   a 1× Evolution-Data Optimized network.

5. A method for measuring signal strength, comprising:
   transmitting a macrotechnology-based transmission to a multi-mode user equipment of a signal including a plurality of data portions and a plurality of gaps between one or more of the plurality of data portions;
   using at least one of the gaps at the multi-mode user equipment for measurement of a first signal strength of a microtechnology-based network; and using a gap previously designated for macrotechnology-based signal strength measurement to perform the microtechnology-based signal strength measurement.

6. The method of claim 5, wherein the at least one of the plurality of gaps is generated based upon a request received from the multi-mode user equipment.

7. The method of claim 5, further comprising:
   defining a new common measurement gap pattern usable by both a microtechnology and a macrotechnology.

8. The method of claim 5, wherein the microtechnology is one of:
   a Wireless Fidelity network,
   a wireless local access network using a home base station,
   a wireless local access network using a home Enhanced Node B, and
   a Wireless Local Area Network; and
   and wherein the macrotechnology is one of:
   a Long Term Evolution (LTE) network,
   a Ultra Mobile Broadband (UMB) network;
   a Code Division Multiple Access 2000 network;
   a Universal Mobile Telecommunications System Terrestrial Radio Access Network; a Global System for Mobile Communications (GSM) network;
   a GSM EDGE Radio Access Network; and
   a 1× Evolution-Data Optimized network.

9. A multi-mode user equipment comprising:
   one or more components configured to:
   receive a macrotechnology-based signal comprising a plurality of data portions and a plurality of gaps between one or more of the plurality of data portions;
   during at least one of the gaps, measure a first signal strength of a microtechnology-based network, wherein the at least one of the gaps used to perform the microtechnology-based signal strength measurement was previously designated for macrotechnology-based signal strength measurement.

10. The multi-mode user equipment of claim 9, wherein the at least one of the plurality of gaps is generated based upon a request from the multi-mode user equipment.

11. The multi-mode user equipment of claim 9, wherein the one or more components are further configured to:
    define a new common measurement gap pattern usable by both a microtechnology and a macrotechnology.

12. The multi-mode user equipment of claim 9, wherein the microtechnology is one of:
    a Wireless Fidelity network,
    a wireless local access network using a home base station,
    a wireless local access network using a home Enhanced Node B, and
    a Wireless Local Area Network; and
    wherein the macrotechnology is one of:
    a Long Term Evolution (LTE) network,
    a Ultra Mobile Broadband (UMB) network;
    a Code Division Multiple Access 2000 network;
    a Universal Mobile Telecommunications System Terrestrial Radio Access Network; a Global System for Mobile Communications (GSM) network;
    a GSM EDGE Radio Access Network; and
    a 1× Evolution-Data Optimized network.

\* \* \* \* \*